United States Patent [19]
Christensen et al.

[11] Patent Number: 5,404,699
[45] Date of Patent: Apr. 11, 1995

[54] KNIFE EDGED STALK ROLLS

[75] Inventors: Timothy F. Christensen, Orion; Bonnie D. Adams, Port Byron; Jerry A. Sandau, Orion, all of Ill.

[73] Assignee: Deere & Company, Moline, Ill.

[21] Appl. No.: 62,524

[22] Filed: May 11, 1993

[51] Int. Cl.$^6$ .............................................. A01D 45/02
[52] U.S. Cl. ..................... 56/104; 460/31; 460/33
[58] Field of Search ............... 56/52, 53, 60, 94, 104; 460/29, 30, 31, 32, 33

[56] References Cited

U.S. PATENT DOCUMENTS

| | | | |
|---|---|---|---|
| 1,188,084 | 6/1916 | Kreitzer | 460/33 |
| 1,493,626 | 5/1924 | Gebhardt et al. | 460/31 |
| 2,469,687 | 5/1949 | Fergason | 460/34 |
| 2,538,965 | 1/1951 | Fergason | 460/27 |
| 3,101,720 | 8/1963 | Karlsson | 460/31 |
| 3,340,702 | 2/1967 | Russell | 56/104 |
| 3,707,833 | 1/1973 | Sutton | 460/29 X |
| 4,233,804 | 11/1980 | Fischer et al. | 56/104 |
| 4,845,930 | 7/1989 | Dow | 56/113 |
| 4,974,402 | 12/1990 | Ostrup et al. | 56/102 |
| 5,009,061 | 4/1991 | Heuling | 56/104 |
| 5,040,361 | 8/1991 | Briesemeister | 56/52 |

OTHER PUBLICATIONS

Geringhoff Brochure entitled "Pick Corn Chop Stalks", 4 pages, published in Canada (undated).
Pixall Brochure entitled "Pixall Knife Rolls", 4 pages, published in U.S.A., 1992.

*Primary Examiner*—David J. Bagnell

[57] ABSTRACT

A stalk roll comprises a cylindrical shell having six integral flutes. Each flute is provided with a knife edge having a leading surface and a trailing surface. The leading surface has a forward slope of approximately 10° from the plane formed by the central longitudinal axis of the cylindrical shell and the vertex of the respective knife edge. The trailing surface has a reverse slope of approximately 30° from the plane formed by the central longitudinal axis of the cylindrical shell and the vertex of the respective knife edge. The cylindrical shell comprises two semi-cylindrical pieces that are clamped about a drive shaft of a corn harvesting head by associated bolts.

18 Claims, 2 Drawing Sheets

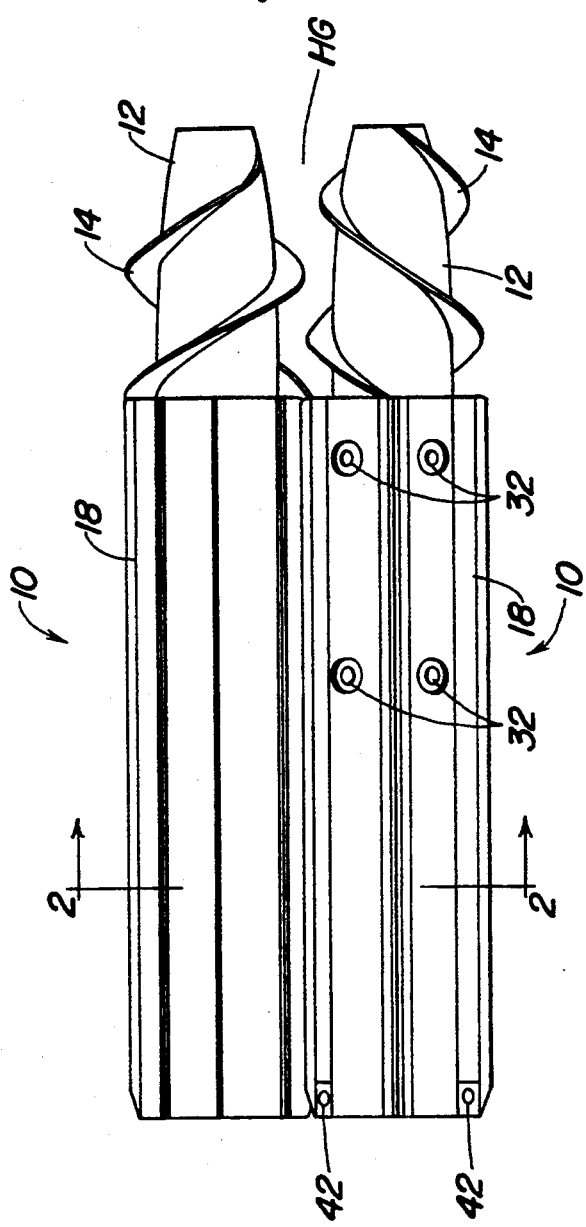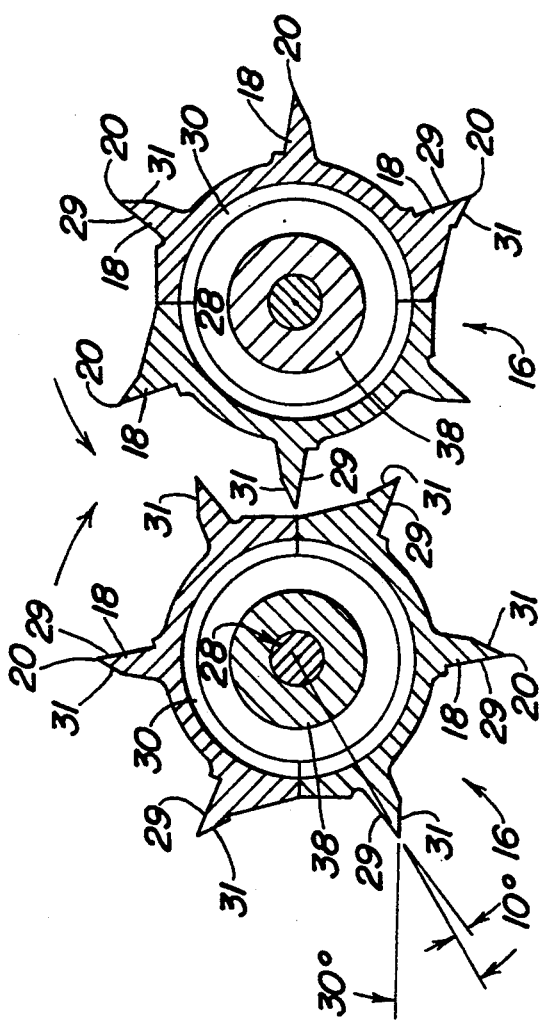

KNIFE EDGED STALK ROLLS

BACKGROUND OF THE INVENTION

1. Field of the Invention

The invention is directed to a knife edge stalk roll for a corn header.

2. Description of the Prior Art

Modern corn headers are provided with a number of row crop dividing snouts for directing the corn stalks into harvesting gaps defined by the snouts. Gathering chains located in the harvesting gaps draw the stalks towards the header. Stalk rolls located beneath the gathering chains pull the stalks rapidly downward returning the stalk to the field. Two snapper bars are located in the harvesting gap above the stalk rolls. The snapper bars are spaced from one another to prevent ears of corn from passing between the bars. The ears are snapped from the stalk and directed to the combine by the corn header.

Current residue management rules mandate that the farmer keep a certain percentage of crop residue on the land to prevent erosion. With new minimum tillage practices it is becoming increasingly important to chop up the corn stalks before returning them to the field so they more easily decompose. Chopping the stalks into shorter lengths also provides better clearance for tillage tools. This eliminates the plugging of tillage tools common in longer stalks. A chopping stalk roll is more aggressive than a conventional stalk roll. A more aggressive stalk roll reduces trash intake into the corn head and the combine. Thereby improving overall combine efficiency and performance.

Case IH corn heads use stalk rolls having four knifes that are bolted to a solid shaft. Adjoining stalk rolls are registered with one another so that as the stalk rolls are rotated the opposed knifes come into contact with opposite sides of the stalk at the same general location thereby cutting the stalk into smaller pieces. It is important that the blades are correctly registered with one another, and that the blades are correctly spaced from one another.

U.S. Pat. Nos. 4,845,930 and 5,040,361 disclose stalk rolls having interleaved canted blades for chopping the corn stalks. U.S. Pat. No. 4,233,804 discloses a stalk roll having six flutes in which three of the flutes are radially aligned with the central longitudinal axis of the stalk roll. Other chopping stalk rolls are disclosed in U.S. Pat. Nos. 3,304,702 and 4,974,402.

Semi-cylindrical husking rolls have been clamped onto drive shafts by bolts as disclosed in U.S. Pat. Nos. 2,469,687, 2,538,965 and 3,101,720.

SUMMARY

It is an object of the present invention to provide a simple stalk roll structure that effectively and efficiently chops corn stalks during harvesting.

It is a feature of the present invention that each stalk roll is provided with six outwardly extending integral flutes. Each flute has a knife edge that is provided with a leading surface and a trailing surface. A respective knife edge extends the length of each flute. The leading surface of the knife edge has a ten degree forward slope, whereas the trailing surface has a thirty degree reverse slope from a radial plane extending through the vertex of the knife edge and the central longitudinal axis of the stalk roll. Therefore the leading surface is steeper than the trailing surface of each knife edge.

The stalk rolls of the present invention are designed to be mounted to drive shafts located on either side of the harvesting gap in a corn head. The drive shafts rotate the stalk rolls in opposite directions to pull the corn stalks downwardly through the harvesting gap so that the ears of corn are snapped off by the snapper bars located above the stalk rolls. The radially extending flutes of the stalk rolls located in a harvesting gap are interleaved with one another.

It is another feature of the present invention that the stalk roll comprises a cylindrical shell formed by two semi-cylindrical pieces that are clamped about a drive shaft.

Bolts extend between the two semi-cylindrical pieces to pull the pieces together thereby clamping the stalk rolls to the drive shaft.

BRIEF DESCRIPTION OF THE DRAWINGS

FIG. 1 is a top view of the stalk rolls.

FIG. 2 is a cross sectional view taken along line 2—2 in FIG. 1.

DETAILED DESCRIPTION

Figure 3:
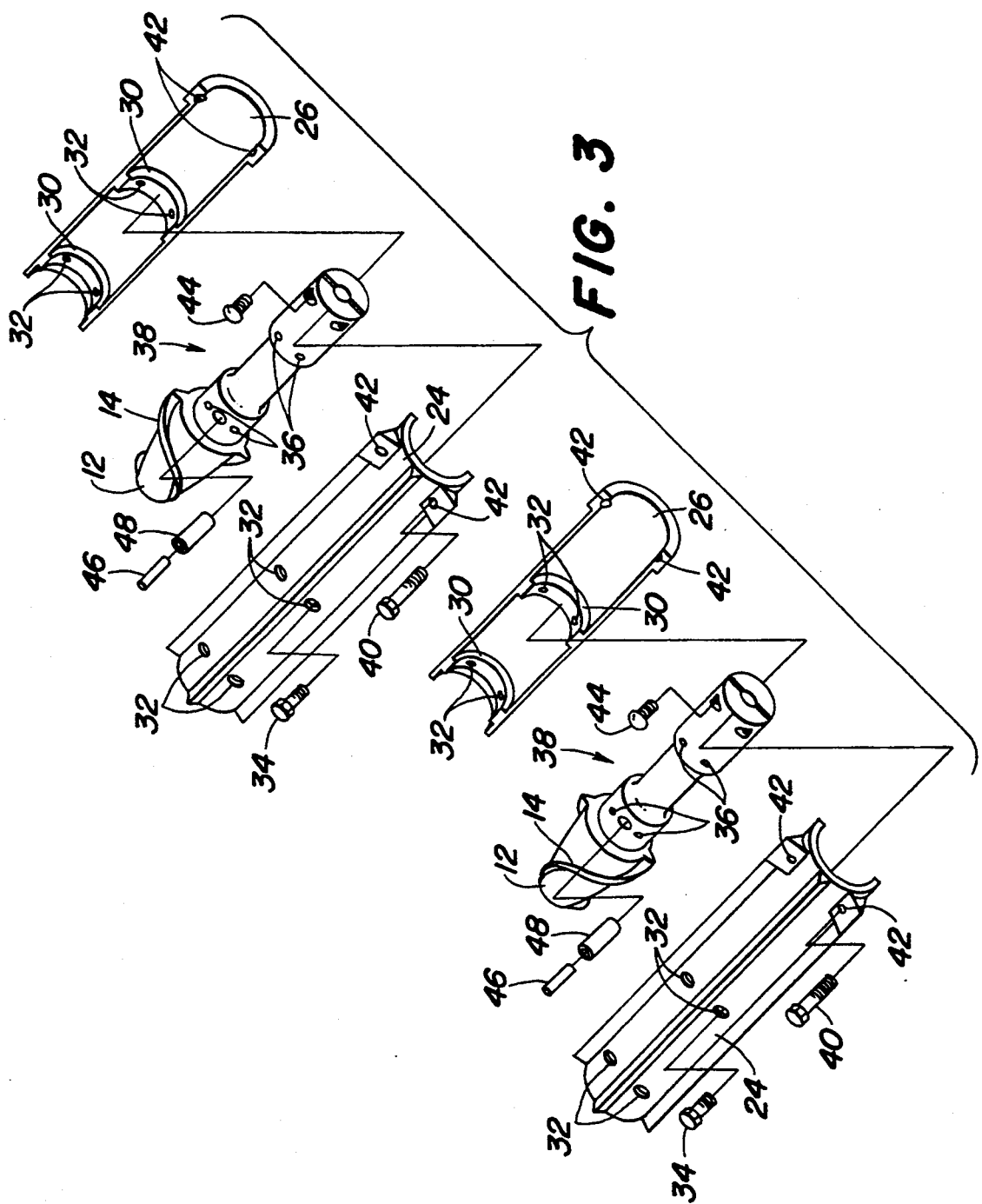
FIG. 3 is an exploded view of the stalk rolls.

Each harvesting gap HG on a corn harvesting header is provided with two stalk rolls arranged parallel to one another. The two stalk rolls 10 are provided with noses 12 having helical flighting 14. Immediately behind the noses are cylindrical shells 16 having six integral longitudinal flutes 18. Each flute is provided with a knife edge 20. The knife edges 20 are substantially parallel to the central longitudinal axis A of the cylindrical shell 16.

Each cylindrical shell comprises two semi-cylindrical pieces 24 and 26 that are bolted to the stalk roll drive shaft 28. The bolt holes and bolts form a means for mounting the stalk roll to the drive shaft and are described in greater detail below.

Each semi-cylindrical piece is cast having three integral flutes. The flutes are then machined to define the knife edges. Each knife edge has a leading surface 29 and a trailing surface 31 that form an acute angle between them of approximately 40°. The leading surface is a forward sloping surface, sloping approximately 10° to the radial plane defined by the central longitudinal axis of the cylindrical shell and the vertex of the knife edge. The trailing surface is a reverse sloping surface, slopes approximately 30° to the radial plane defined by the central longitudinal axis and the vertex of the knife edge.

Tungsten carbide is applied to the leading edges to make the knife edges self-sharpening. As illustrated in FIG. 2 the flutes of the adjoining stalk rolls are offset (interleaved) to one another.

FIG. 3 better illustrates the mounting structure. Each shell is provided with two inwardly extending annular ridges 30 having bolt holes 32. Short bolts 34 are screwed into holes 32 and engage bolt holes 36 located on an intermediate drive shaft 38. Long bolts 40 are screwed into holes 42 for clamping the cylindrical shell together.

The intermediate drive shaft is clamped to the main drive shaft by bolts 44. In addition two pins 46 and 48 prevent relative rotation between the intermediate drive shaft and the main drive shaft.

The invention should not be limited by the above-described embodiment, but should be limited solely by the claims that follow.

We claim:

1. A stalk roll for a corn harvesting header, the stalk roll comprising:
    a cylindrical shell having a central longitudinal axis;
    longitudinal integral flutes extending radially from the shell, the flutes are substantially parallel to the central longitudinal axis, each flute is provided with a knife edge, each knife edge has a leading surface and a trailing surface, the leading surface has a forward slope, the trailing surface has a reverse slope, the leading surface is steeper than the trailing surface and forms an acute angle with the trailing surface; and
    means for mounting the shell to a drive shaft of a corn harvesting header.

2. A stalk roll as defined by claim 1 wherein the cylindrical shell is provided with six flutes.

3. A stalk roll as defined by claim 2 wherein the forward slope of the leading surface is approximately 10° from the plane formed by the central longitudinal axis and the vertex of the respective knife edge.

4. A stalk roll as defined by claim 3 wherein the reverse slope of the trailing surface is approximately 30° from the plane formed by the central longitudinal axis and the vertex of the respective knife edge.

5. A stalk roll as defined by claim 2 wherein the reverse slope of the trailing surface is approximately 30° from the plane formed by the central longitudinal axis and the vertex of the respective knife edge.

6. A stalk roll as defined by claim 2 wherein the cylindrical shell comprises two semi-cylindrical pieces, each semi-cylindrical piece having three flutes.

7. A stalk roll as defined by claim 6 wherein the means for mounting comprises at least two bolt holes formed in each semi-cylindrical piece and associated bolts for clamping the semi-cylindrical pieces about the drive shaft of the corn harvesting head.

8. A stalk roll as defined by claim 1 wherein the acute angle formed by the leading surface and the trailing surface is approximately 40°.

9. A stalk roll as defined by claim 1 wherein each knife edge is self-sharpening.

10. A stalk roll as defined by claim 9 wherein the leading surface is coated with tungsten carbide.

11. A pair of adjoining stalk rolls for a corn header, the adjoining stalk rolls defining a harvesting gap, each stalk roll comprising:
    a cylindrical shell having a central longitudinal axis;
    longitudinal integral flutes extending radially from the shell, the flutes are substantially parallel to the central longitudinal axis, each flute is provided with a knife edge, each knife edge has a leading surface and a trailing surface, the leading surface has a forward slope, the trailing surface has a reverse slope, the leading surface is steeper than the trailing surface and forms an acute angle with the trailing surface;
    whereby the flutes of the pair of adjoining stalk rolls are offset to one another.

12. A pair of adjoining stalk rolls as defined by claim 11 wherein each knife edge is self-sharpening.

13. A pair of adjoining stalk rolls as defined by claim 12 wherein each of the cylindrical shells is provided with six flutes.

14. A pair of adjoining stalk rolls as defined by claim 13 wherein the forward slope of each leading surface is approximately 10° from the plane formed by the central longitudinal axis and the vertex of the respective knife edge.

15. A pair of adjoining stalk rolls as defined by claim 14 wherein each reverse slope of the trailing surface is approximately 30° from the plane formed by the central longitudinal axis and the vertex of the respective knife edge.

16. A pair of adjoining stalk rolls as defined by claim 12 wherein each reverse slope of the trailing surface is approximately 30° from the plane formed by the central longitudinal axis and the vertex of the respective knife edge.

17. A pair of adjoining stalk rolls as defined by claim 12 wherein each acute angle formed by the leading surface and the trailing surface is approximately 40°.

18. A pair of adjoining stalk rolls as defined by claim 12 wherein each cylindrical shell comprises two semi-cylindrical pieces, each semi-cylindrical piece having three flutes.

* * * * *